United States Patent [19]

Berthe et al.

[11] Patent Number: 5,409,426
[45] Date of Patent: Apr. 25, 1995

[54] AUTOMATIC TRANSMISSION CONTROL DEVICE WITH STEPPED GEARS

[75] Inventors: Jean-Paul Berthe, Sartrouville; Benoît Honore, Chatou; Francois Leorat, Versailles, all of France

[73] Assignee: Regie Nationale Des Usines Renault S.A., Boulogne Billancourt, France

[21] Appl. No.: 63,468

[22] Filed: May 19, 1993

[30] Foreign Application Priority Data

May 19, 1992 [FR] France ................... 92 06035

[51] Int. Cl.⁶ ............................................. H16H 61/06
[52] U.S. Cl. ....................................... 475/118; 475/120
[58] Field of Search ................ 475/118, 120, 125, 127

[56] References Cited

U.S. PATENT DOCUMENTS

| | | | |
|---|---|---|---|
| 4,724,939 | 2/1988 | Lockhart et al. | |
| 4,757,886 | 7/1988 | Brown et al. | 192/3.3 |
| 4,805,750 | 2/1989 | Nitz . | |
| 4,880,090 | 11/1989 | Ando | 192/3.3 |
| 4,890,707 | 1/1990 | Suzuki | 192/3.3 |
| 4,957,194 | 9/1990 | Sawa et al. | 192/0.096 |
| 5,029,087 | 7/1991 | Cowan et al. | 364/424.1 |
| 5,033,328 | 7/1991 | Shimanaka . | |
| 5,060,769 | 10/1991 | Yoshimura et al. | 192/3.29 |
| 5,115,897 | 5/1992 | Yoshimura et al. | 192/0.052 |
| 5,143,191 | 9/1992 | Nobumoto et al. | 192/76 |
| 5,226,513 | 7/1993 | Shibayama | 192/0.032 |
| 5,291,979 | 3/1994 | Iizuka | 192/0.092 |
| 5,303,616 | 4/1994 | Palansky et al. | 74/890 |
| 5,318,159 | 6/1994 | Kashiwabara | 477/169 |
| 5,323,320 | 6/1994 | Hathaway et al. | 364/424.1 |
| 5,325,946 | 7/1994 | Kashiwabara et al. | 192/3.31 |

FOREIGN PATENT DOCUMENTS

| | | |
|---|---|---|
| 0120779 | 10/1984 | European Pat. Off. . |
| 0410223 | 1/1991 | European Pat. Off. . |
| 2483649 | 12/1981 | France . |
| 2570458 | 3/1986 | France . |

Primary Examiner—Dirk Wright
Attorney, Agent, or Firm—Oblon, Spivak, McClelland, Maier & Neustadt

[57] ABSTRACT

Automatic transmission control device with stepped gears comprising a torque converter (1) equipped with bridging means (6, 6'), a planetary gear train (2), several hydraulic receivers ($E_i$, $F_i$) assuring the switching of planetary gear train (2), and a hydraulic distributor (16, 17) delivering a line pressure PL, which makes it possible to feed selectively receivers ($E_i$, $F_i$) under the control of a computer, according to the data concerning the operation of the vehicle equipped with the transmission, characterized in that at least one switching element (8) is dimensioned to be able to slip in a controlled manner, particularly when converter (1) is bridged, in response to a momentary reduction of line pressure PL, and in that this slipping is servocontrolled, by line pressure PL, at set values depending on torque Cm and engine speed $\omega m$.

13 Claims, 3 Drawing Sheets

AUTOMATIC TRANSMISSION CONTROL DEVICE WITH STEPPED GEARS

BACKGROUND OF THE INVENTION

1. Field of the Invention

This invention relates to the technical field of automatic transmissions with stepped gears comprising a hydraulic torque converter able to bridge on certain gears.

2. Discussion of Background

It has become common practice to equip automatic transmissions with a bridging system—or lock-up—in the converter, to make the turbine and the impeller integral under certain engine speed and load conditions, which makes it possible to eliminate the considerable slipping of the converter and thus to improve the efficiency of the transmission under the conditions in question. Control of the bridging is performed most often by on or off, which implies that during the phases where the lock-up is closed, a damper is provided to best minimize the effect of the acyclic motions of the engine throughout the kinematic chain.

On this subject, publication EP 179 683 of the applicant describes a stepped automatic transmission control device having four main forward gears and one reverse gear, equipped with a hydrokinetic torque converter equipped with a torsion vibration damper intended to filter the irregularities of the engine torque on the gears for which the converter does not intervene in the transmission of the engine torque.

To eliminate the torsion damper which is difficult to house in the shell of the converter and, based on an often limited and inadequate efficiency, it has been proposed to make, in a controlled and very limited manner, the bridging clutch slip so as to make it play a role of instantaneous torque limiter, which then imparts to it a capability of filtering torsion vibrations produced by the acyclic motions of the engine. Nevertheless, this idea, perfectly correct in its principle, comes up against significant difficulties of practical use, because it is extremely difficult, indeed impossible, to find in the very constrained dimensions of a converter the necessary space to install a clutch having a friction surface that is suitable and sufficiently slightly charged with pressure to guarantee an error-free operation for the entire life of the vehicle. Moreover, the considerable deformations that a converter undergoes during its operation further complicate the problem, because it is important then to find mountings making it possible to separate the friction surfaces of the actual elements of the converter to guarantee, in any circumstances, a surface evenness or a perfect coupling of the friction surfaces in contact which, alone, make it possible to expect a sufficient operating life.

Under these conditions, the design of a bridging converter with controlled slipping constitutes an arduous task, whenever the space available axially for the converter is limited, which is the case in most of the transverse structures, for traction vehicles.

SUMMARY OF THE INVENTION

The invention has as its object to produce an automatic transmission control device with stepped gears making it possible to have the advantages, on the subject of filtering, obtained by an instantaneous torque limiting device with controlled slipping, without falling into the most often insurmountable design difficulties encountered in the design of the slipping integrated lock-up converters.

The invention relates to an automatic transmission control device with stepped gears comprising a torque converter equipped with bridging means, a planetary gear train, several hydraulic receivers assuring the switching of the planetary gear train, and a hydraulic distributor delivering a line pressure PL, which makes it possible to feed selectively the receivers under the control of a computer, according to data relating to the operation of the vehicle equipped with the transmission. This device is characterized in that at least one switching element is dimensioned to be able to slip in a controlled manner, particularly when the converter is bridged, in response to a momentary reduction of the line pressure, and in that this slipping is slaved, by line pressure PL, to set values depending on torque Cm and engine speed $\omega$m.

According to an embodiment of the invention, the bridging means integrated into the converter are on/off controlled by the computer of the transmission.

According to an embodiment of the invention, the converter is equipped with an integrated torsion damper.

According to an embodiment of the invention, the device comprises a pressure servocontrol system which feeds, in real time, a control signal TON to a modulating solenoid valve intended to reduce the line pressure momentarily to allow the slipping of the switching element.

According to an embodiment of the invention, the regulation of line pressure PL is controlled by the computer of the transmission which receives data relative to engine torque Cm, to engine speed m and to turbine speed $\omega$t.

According to an embodiment of the invention, the slipping servocontrol loop makes it possible to compare the instantaneous value of the slipping $\delta\omega = \omega m - \omega t$ to a slipping set value $\delta\omega^c$ (Cm, $\omega$m) function of main parameters Cm and $\omega$m, and optionally of secondary parameters, such as engaged gear (N) or oil temperature ($\theta$h).

According to an embodiment of the invention, a regulator makes it possible to calculate pressure reduction $\Delta P_L^c$ imposed on set line pressure $P_L^c$ determined by the computer of the transmission to establish the line pressure set-point during slipping $P_L^c(gl) = P_L^c - \Delta P_L^c$.

According to an embodiment of the invention, a comparison unit assures the calculation of the difference between set pressure $P_L^c(gl)$ and closing-up pressure Po of the switching element, this difference being transmitted to a processing unit which produces its product by the instantaneous value of slipping $\delta\omega$.

According to an embodiment, an integration unit is able to start off the calculation of the energy:

$$Egl = \int_{t_o}^{t} \delta\omega[P^c(gl) - Po]dt,$$

proportional to the energy dissipated in the switching element starting from the beginning $t_o$ of the slipping phase, each time that $\delta\omega$ adopts a nonzero value.

According to an embodiment of the invention, the exceeding by Egl of a preestablished threshold makes it possible to determine that the energy dissipated in the switching element during a slipping phase reached a level jeopardizing the endurance and the operating life of the friction linings of the latter.

According to an embodiment of the invention, the device comprises a main pressure-regulating valve, equalized on one side by a first spring and on the other side by line pressure PL acting in counteraction on a push rod and by modulated control pressure Pm controlled by the modulating solenoid valve, acting, in the same direction as line pressure PL, on the differential surface existing between the main regulating valve and the push rod.

According to an embodiment of the invention, the device comprises a pressure-reducing valve, delivering a feed pressure P1, equalized on one side by a second spring and on the other side by feed pressure $P_1$ itself, brought back in counteraction through a first jet, to assure its own regulation, pressure $P_1$ assuring, by a second jet, the feeding of the modulating solenoid valve.

According to an embodiment of the invention, the switching elements comprise at least two clutches ($E_1$, $E_2$) and three immobilization means ($F_1$, $F_2$, $F_3$) and the switching element pulled by the slipping is a clutch $E_2$ locked at least on the three upper gears of the transmission.

BRIEF DESCRIPTION OF THE DRAWINGS

The invention will be understood better in light of the description of a particular embodiment of the latter, in connection with the accompanying drawings in which.

DETAILED DESCRIPTION OF THE PREFERRED EMBODIMENT

Figure 1:
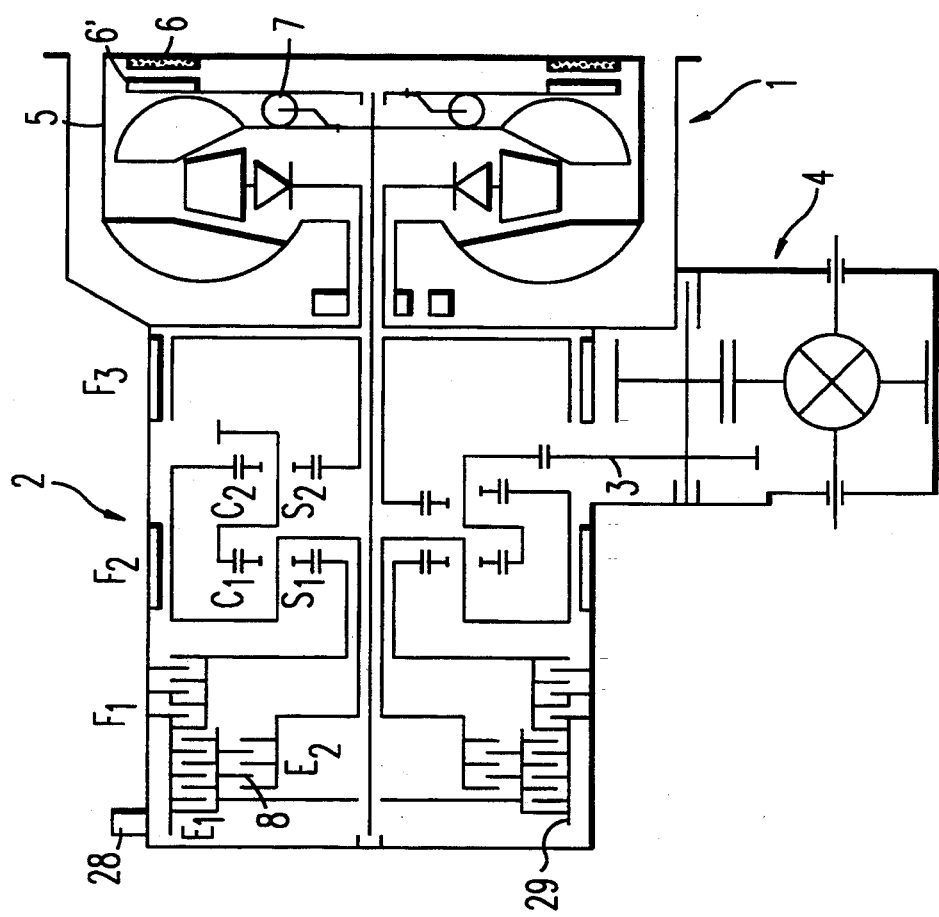
FIG. 1 is a kinematic diagram of an automatic transmission with a double planetary gear train known in the art making it possible to obtain four forward gears and one reverse gear, FIG. 2 exhibits the switching table of the hydraulic receivers of is transmission of FIG. 1.
Figure 3:
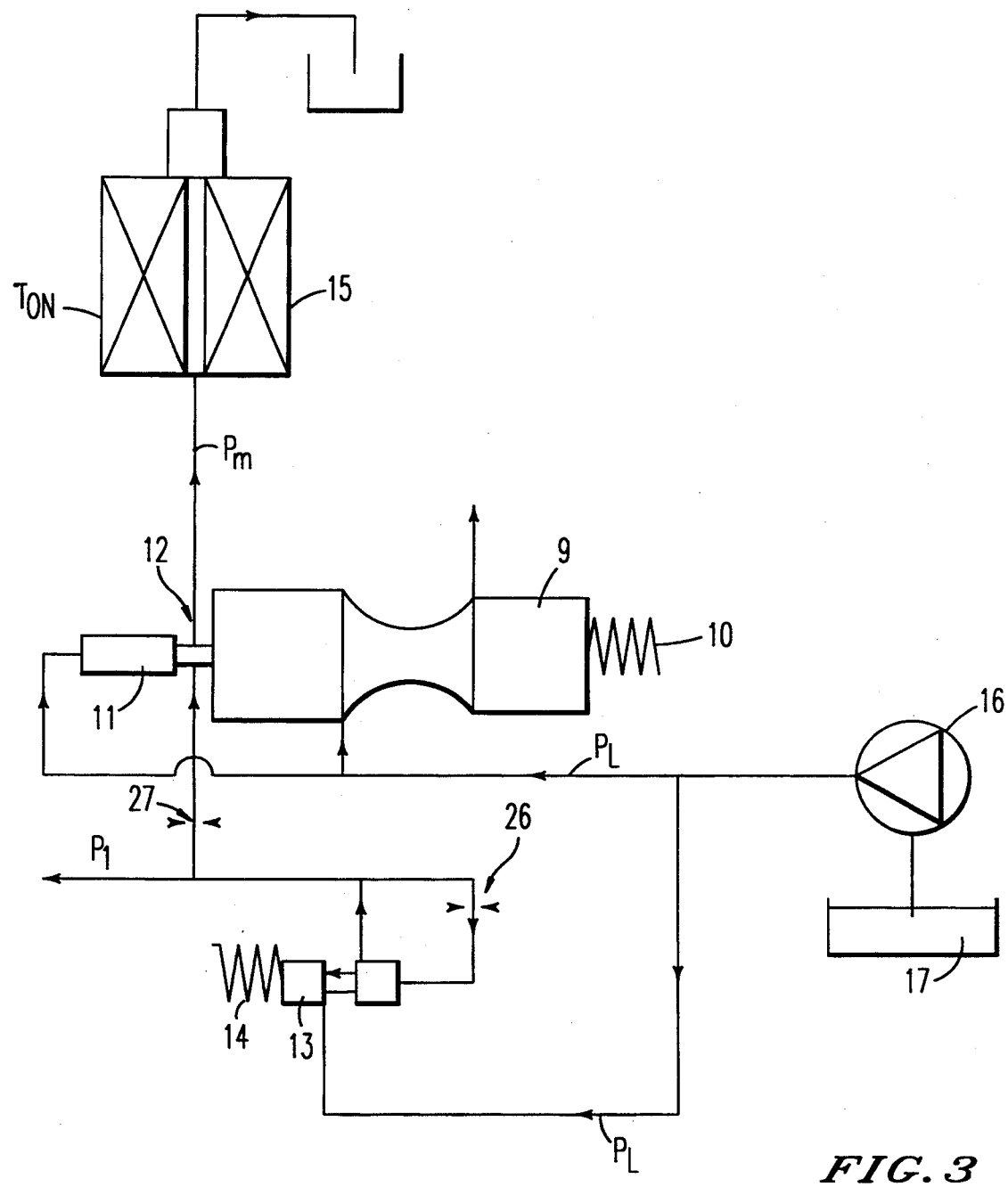
FIG. 3 illustrates the electrohydraulic regulating system used in the FIG. 1 transmission, and FIG. 4 exhibits, in the form of a synoptic chart, the servocontrol system according to the present invention.
Figure 4:
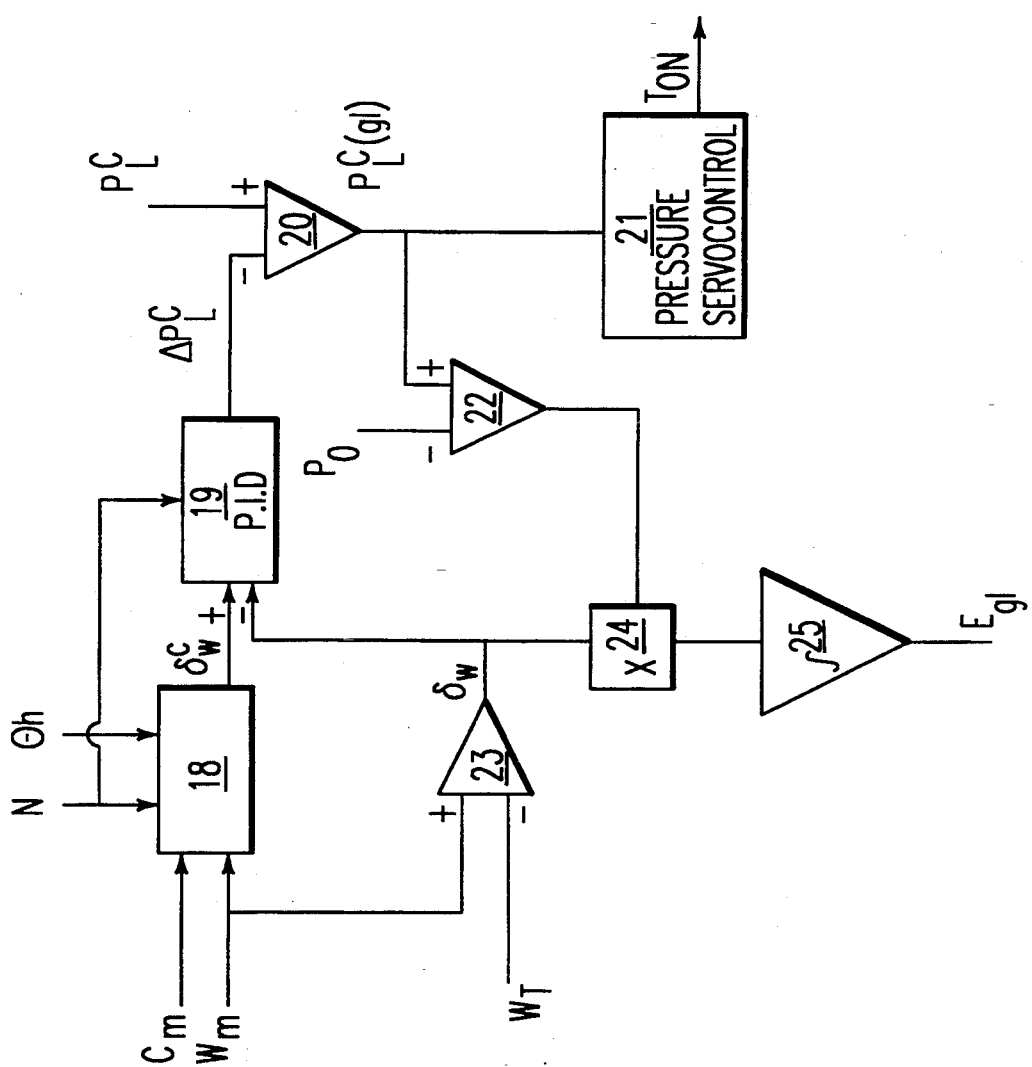

The automatic transmission device illustrated by FIG. 1 exhibits, in a standard way, a hydraulic torque converter 1, associated with a planetary gear train 2 whose movement output ring gear 3 is connected to a differential 4.

Inside enclosure 5 of the converter, an integrated torsion damper 7 and friction linings 6, 6' have been indicated, making it possible, in a usual way, to assure the bridging of converter 1. Planetary gear train 2 is a double planetary gear train, of which it is possible to recognize in particular two ring gears $C_1$, $C_2$ and planet gears $S_1$, $S_2$, belonging respectively to the first and second set of planet gears. Planetary gear train 2 supports a sensor 28 of turbine speed $\omega$, aiming at a target 29. The switching elements responsible for the shifting of the gears consist of two clutches $E_1$, $E_2$ and three immobilization means $F_1$, $F_2$, $F_3$, whose switching table is the object of FIG. 2. In this table, it is noted that second clutch $E_2$, 8 is locked on the three highest forward gears. This feature of second clutch $E_2$, 8 is taken advantage of in the embodiment described, but does not in any case limit the application of the invention to a particular structure.

Actually, the invention consists, first of all, in dimensioning one or more switching elements of an automatic transmission so that, for all the gears on which it is desired to profit from a torque limiting effect, only one of the switching elements can be brought to slip slightly when line pressure PL is reduced in a controlled manner: a servocontrol of the slipping to set values depending on torque Cm and on engine speed $\omega$m, by line pressure PL, thus makes it possible to attain the desired objective.

From the viewpoint of the operating conditions of the friction linings, the situation is very appreciably better than in the case of an integrated lock-up:

actually, for such a lock-up, even a biface, it is difficult to exceed 150 $cm^2$ of lining, while it is common to reach or exceed 500 $cm^2$ in an automatic transmission receiver dimensioned to support the energy dissipated during a gear change. As a result, the power dissipated per $cm^2$ of lining, crucial parameter for the endurance of the linings, is much lower in the case of an embodiment according to this invention;

for the reasons of dimensioning explained above, the specific pressure at which the linings work is also appreciably lower, which also constitutes a favorable element for the endurance of the linings;

finally, at identical slipping angular velocity, the linear slipping velocity of the linings is also significantly lower since approximately in the ratio of the diameters of a receiver and of a converter, which constitutes another factor favorable to the operating life of the linings.

The control device of the invention therefore associates with an automatic transmission with a planetary gear train(s) in which the dimensioning of the hydraulic receivers has been provided so that, in all the gears in which it is desired to profit from a torque limiting effect, only one of the receivers engaged on each gear begins, alone, to slip when the line pressure is reduced in a controlled manner:

an electrohydraulic line pressure regulation controlled by a computer receiving suitable data from engine torque Cm, engine speed $\omega$m and turbine speed $\omega_t$, a lock-up system integrated into the converter and on/off controlled by the same computer, a slipping servocontrol loop $\delta\omega = \omega m - \omega_t$ at a set value $\delta\omega^c$ (Cm, $\omega$m), function of main parameters Cm and $\omega$m, and optionally secondary parameters such as the engaged gear and the oil temperature, by way of nonlimiting example.

Figure 2:
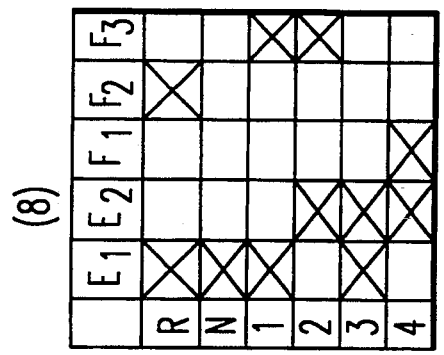

Examination of the switching table of FIG. 2 shows that clutch $E_2$, 8, is common to gears 2, 3 and 4: by controlling the slipping of this clutch to the extent that it has been dimensioned so that it is always the first to slip when the general line pressure for feeding the receivers is reduced in a controlled way, it is therefore possible to profit, in the 2°, 3° and 4° gears, from the torque limiting effect thus obtained to the benefit of the filtering of the torsion vibrations produced by the engine acyclic motions. To limit, over time, the stresses to which the linings of $E_2$, 8, are subjected, during the phases of controlled slipping, the latter will be limited to the conditions of strong torque, low engine speed, the other conditions less difficult to treat being taken into account by torsion damper 7 integrated into converter 1, comprising a traditional lock-up 6, 6' with on/off control.

Damper 7 further can be eliminated if the dimensioning of clutch $E_2$, 8 makes it possible to make operate in any case the linings of clutch $E_2$, 8, under sufficiently favorable conditions, and/or with engines with a high number of cylinders (greater than or equal to six in most cases).

The pressure regulation, described here by way of nonlimiting example and according to the principles explained in publication EP-0 179 683 of the applicant, uses a main pressure-regulating valve 9, equalized on one side by a first spring 10, and on the other side by regulated line pressure PL acting in counterreaction on a push rod 11 and by modulated control pressure Pm acting on differential surface 12 between valve 9 and push rod 11, in the same direction as regulated pressure PL.

Furthermore, from pressure $P_L$, a pressure-reducing valve 13, delivering a feed pressure $P_1$, is equalized on one side by a second spring 14 and on the other side by pressure $P_1$ itself, brought back in counterreaction through a first jet 26, to assure its own regulation at a constant value.

This pressure $P_1$ is used in the feeding, through a second jet 27, of modulating solenoid valve 15, which determines the value of modulated pressure Pm acting toward the right on surface differential 12 existing between regulating valve 9 and push rod 11. This modulated pressure Pm is in linear relation with control signal TON of modulating solenoid valve 15. The source of hydraulic power can be, in a nonlimiting way, a pump 16 drawing from an oil reserve 17.

The servocontrol of the slipping of clutch $E_2$ consists in calculating, in real time, the value of TON which makes it possible to obtain instantaneous line pressure level $P_L$ allowing the desired slipping of $E_2$.

To do this, starting from the measurement and the continuous calculation:

of engine speed $\omega m$, supplied by the injection computer, or by a specialized sensor, not shown, whose signal is processed by the automatic transmission computer;

of turbine speed $\omega_t$ most often supplied by a specific sensor 28 aiming at a target 29 that is also specific;

of engine torque Cm; there are calculated:

slipping set point laws, $\delta\omega^c$, functions of speed m and of engine torque Cm, and, if necessary, of engaged gear N, of oil temperature $\theta h$ or other pertinent variables, in slipping set point unit 18, and instantaneous effective slipping $\delta\omega = \omega m - \omega_t$ in slipping calculation unit 23.

Difference $\delta\omega^c - \delta\omega$ is sent to a P.I.D. regulator 19—this type of regulator being naturally nonlimiting—which calculates a correction $\Delta P_L^c$ at set value $P_L^c$ produced for pressure-servocontrol system 21 by the computer of the automatic transmission.

Pressure-servocontrol system 21, which can be, in a nonlimiting way, in accordance with that described in publication FR 2 616 931 of the applicant, produces the TON signal controlling modulating solenoid valve 15. The various gains of regulator 19 can be adjusted, as a function of established gear N, and also during the gear changes.

If the closing-up pressure of clutch $E_2$ is designated by Po, difference $P_L^c$ (gl)−PO, where $P_L^c$ (gl)=$P_L^c$ −$\Delta P_L^c$, is calculated in comparison unit 22, then product $\delta\omega \times [P^c$ (gl)−Po] in processing unit 24 is calculated. Each time that $\delta\omega$ passes from a zero value (no slipping) to a nonzero value (instant $t_o$), integration unit 25 starts off the integration of the product, $$Egl = \int_{t_o}^{t} \delta\omega [P^c(gl) - Po]dt,$$

Energy Egl is proportional to the energy dissipated in clutch $E_2$ starting from beginning $t_o$ of the slipping phase. If Egl exceeds a certain threshold set in advance, this means that during the controlled slipping phase being considered, the energy dissipated in clutch E2 has reached a level such that the endurance and the operating life of the friction linings runs the risk of being jeopardized, and it is therefore suitable to take measures of conservation (reduction of allowed slipping $\delta\omega^c$ or shifting down to a lower gear).

Obviously, numerous modification and variation of the present invention are possible in light of the above teachings. It is therefore to be understood that within the scope of the appended claim, the invention may be practiced otherwise than as specifically described herein.

What is claimed as new and desired to be secured by Letters Patent of the United States is:

1. Automatic transmission control device with stepped gears comprising:

a torque converter equipped with bridging means, a planetary gear train, a plurality of switching elements having hydraulic receivers for switching of the planetary gear train, and a hydraulic distributor delivering a line pressure PL which selectively feeds receivers under the control of a computer according to data relating to the operation of the vehicle equipped with the transmission, wherein at least one of said switching elements is dimensioned to be able to slip in a controlled manner when said converter is bridged in response to a momentary reduction of line pressure PL, and wherein said slipping is servocontrolled by the line pressure PL at set values depending on torque Cm and engine speed $\omega m$.

2. A control device according to claim 1, wherein said bridging means are integrated into said converter are on/off controlled by the transmission computer.

3. A control device according to claim 1, wherein said converter includes an integrated torsion damper.

4. A control device according to any one of claims 1, 2 or 3, further comprising a pressure-servocontrol system which delivers, in real time, a control signal TON to a modulating solenoid valve for momentarily lowering the line pressure PL to allow the slipping of said one of said switching elements.

5. A control device according to any one of claims 1, 2 or 3, wherein the regulation of line pressure PL is controlled by the computer of the transmission which receives data relative to engine torque Cm, to engine speed $\omega m$ and to turbine speed $\omega t$.

6. A control device according to any one of the claims 1, 2 or 3, wherein a slipping servocontrol loop compares the instantaneous value of slipping $\delta\omega = \omega m - \omega t$ to a slipping set value $\delta\omega^c$(Cm, $\omega m$) function of main parameters Cm and $\omega m$, and of secondary parameters including an engaged gear and oil temperature ($\theta h$).

7. A control device according to claim 6, further comprising a regulator for calculating a pressure reduction $\Delta P_L^c$ that must be imposed at a set line pressure $P_L^c$ determined by the computer of the transmission, to establish a line pressure set point during slipping $P_L^c(gl) = P_L^c - P_C$.

8. A control device according to claim 7, further comprising a comparison unit calculating the calculation of the difference between set pressure point $P^c(gl)$ and closing-up pressure Po of the switching element, this difference being transmitted to a processing unit which produces its product by the instantaneous value of slipping $\delta\omega$.

9. A control device according to claim 8, further comprising an integration unit for starting the calculation of the energy:

$$Egl = \int_{t_o}^{t} \delta\omega[P^c(gl) - Po]dt,$$

proportional to the energy dissipated in the switching element starting from beginning $t_o$ of the slipping phase, each time that $\delta\omega$ adopts a nonzero value.

10. A control device according to claim 8, wherein the exceeding by Egl of a preestablished threshold determines that the energy dissipated in said switching element during a slipping phase has reached a level jeopardizing the endurance and the operating life of the friction linings of the latter.

11. A control device according to claim 4, further comprising a main pressure-regulating valve balanced on one side by a first spring and on the other by the regulated pressure PL acting in counteraction on a push rod of the main pressure regulating valve, and by modulated control pressure Pm controlled by a modulating solenoid valve, acting in the same direction as line pressure PL, on a differential surface existing between said main regulating valve and said push rod.

12. A control device according to claim 11, further comprising a pressure-reducing valve delivering a feed pressure $P_1$, balanced on one side by a second spring and on the other side by the pressure $P_1$, a first jet for self regulating the pressure reducing valve, and a second jet for feeding the modulating solenoid valve.

13. A control device according to any one of claims 1, 2 or 3, wherein the switching elements comprise at least two clutches and three immobilization means and wherein the switching element pulled by the slipping is one of said clutches locked on at least the three upper gears of the transmission.

* * * * *